US012786097B2

(12) United States Patent
Chen et al.

(10) Patent No.: US 12,786,097 B2
(45) Date of Patent: Nov. 3, 2026

(54) BORDER GATEWAY PROTOCOL DYNAMIC ROUTE AGGREGATION

(71) Applicant: Palo Alto Networks, Inc., Santa Clara, CA (US)

(72) Inventors: Enke Chen, San Jose, CA (US); Jining Tian, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 559 days.

(21) Appl. No.: 18/359,978

(22) Filed: Jul. 27, 2023

(65) Prior Publication Data

US 2025/0039076 A1 Jan. 30, 2025

(51) Int. Cl.

| | |
|---|---|
| ***H04L 45/748*** | (2022.01) |
| ***G06F 15/173*** | (2006.01) |
| ***G06F 15/177*** | (2006.01) |
| ***H04L 12/28*** | (2006.01) |
| ***H04L 45/02*** | (2022.01) |

(52) U.S. Cl.

CPC .................................... *H04L 45/04* (2013.01)

(58) Field of Classification Search

CPC ....... H04L 45/04; H04L 45/748; H04L 45/02; H04L 61/00; H04L 45/125; H04L 63/0272; H04L 45/123; H04L 9/40; H04L 12/28; H04L 45/033; H04L 12/4641; H04L 45/24; H04L 45/42; H04L 45/22

USPC .......................................................... 370/389

See application file for complete search history.

(56) References Cited

U.S. PATENT DOCUMENTS

| | | | | |
|---|---|---|---|---|
| 6,611,832 | B1 * | 8/2003 | van Lunteren | H04L 61/4552 |
| 8,098,578 | B1 * | 1/2012 | Shah | G01V 1/28<br>370/230 |
| 8,121,130 | B2 * | 2/2012 | White | H04L 12/28<br>370/395.54 |
| 10,200,228 | B2 * | 2/2019 | Wu | H04L 1/08 |
| 10,826,827 | B1 * | 11/2020 | Natal | H04L 12/4625 |
| 12,267,163 | B2 * | 4/2025 | Gan | H03M 13/1105 |
| 12,445,378 | B2 * | 10/2025 | Okada | H04L 45/123 |
| 2005/0265308 | A1 * | 12/2005 | Barbir | H04L 12/4641<br>370/351 |
| 2007/0214280 | A1 * | 9/2007 | Patel | H04L 45/28<br>709/239 |
| 2010/0208744 | A1 * | 8/2010 | Shaikh | H04L 45/42<br>370/408 |

(Continued)

FOREIGN PATENT DOCUMENTS

WO WO-2013071803 A1 * 5/2013 ......... H04L 61/5014

*Primary Examiner* — Edan Orgad
*Assistant Examiner* — Vanneilian Lalchinthang
(74) *Attorney, Agent, or Firm* — Gilliam IP PLLC

(57) ABSTRACT

A contributor-aggregator network configuration disclosed herein automates aggregation of network prefixes allocated to an autonomous system for a border network element dubbed a "contributor." The contributor advertises allocated network prefixes to an aggregator network element "aggregator" and additionally identifies and encodes aggregation length parameters according to a routing protocol in the advertisements that indicate how to aggregate network prefixes. The aggregator advertises aggregated network prefixes identified based on the encoded parameters to its peers to reduce overall load by simplifying routing and advertisement to the aggregated network prefixes.

20 Claims, 4 Drawing Sheets

(56) References Cited

U.S. PATENT DOCUMENTS

| | | | | | |
|---|---|---|---|---|---|
| 2013/0117449 | A1* | 5/2013 | Hares | H04L 9/40 | 709/225 |
| 2014/0301396 | A1* | 10/2014 | Hong | H04L 45/745 | 370/392 |
| 2015/0236752 | A1* | 8/2015 | Cruz | H04L 63/1441 | 375/135 |

* cited by examiner

BORDER GATEWAY PROTOCOL DYNAMIC ROUTE AGGREGATION

BACKGROUND

The disclosure generally relates to transmission of digital information (e.g., CPC subclass H04L) and to wireless communication networks (e.g., CPC subclass H04W).

Border Gateway Protocol (BGP) is a routing protocol that connects autonomous systems to the Internet via border network elements that interface with ingress and egress traffic between the autonomous systems and the Internet. Each autonomous system comprises network prefixes managed by an administrative entity, e.g., a border network element. Border network elements managing autonomous systems establish connections as peers in BGP. Network prefixes advertised between BGP peers can be appended with community attributes that specify handling of those network prefixes such as geographic-based advertisement restrictions, peer type restrictions, local preference adjustments, denial-of-service attack identification, etc. BGP peers are also able to associate network prefixes with extended community attributes for specifying additional information for the desired handling.

BRIEF DESCRIPTION OF THE DRAWINGS

Embodiments of the disclosure may be better understood by referencing the accompanying drawings.

DESCRIPTION

Figure 1:
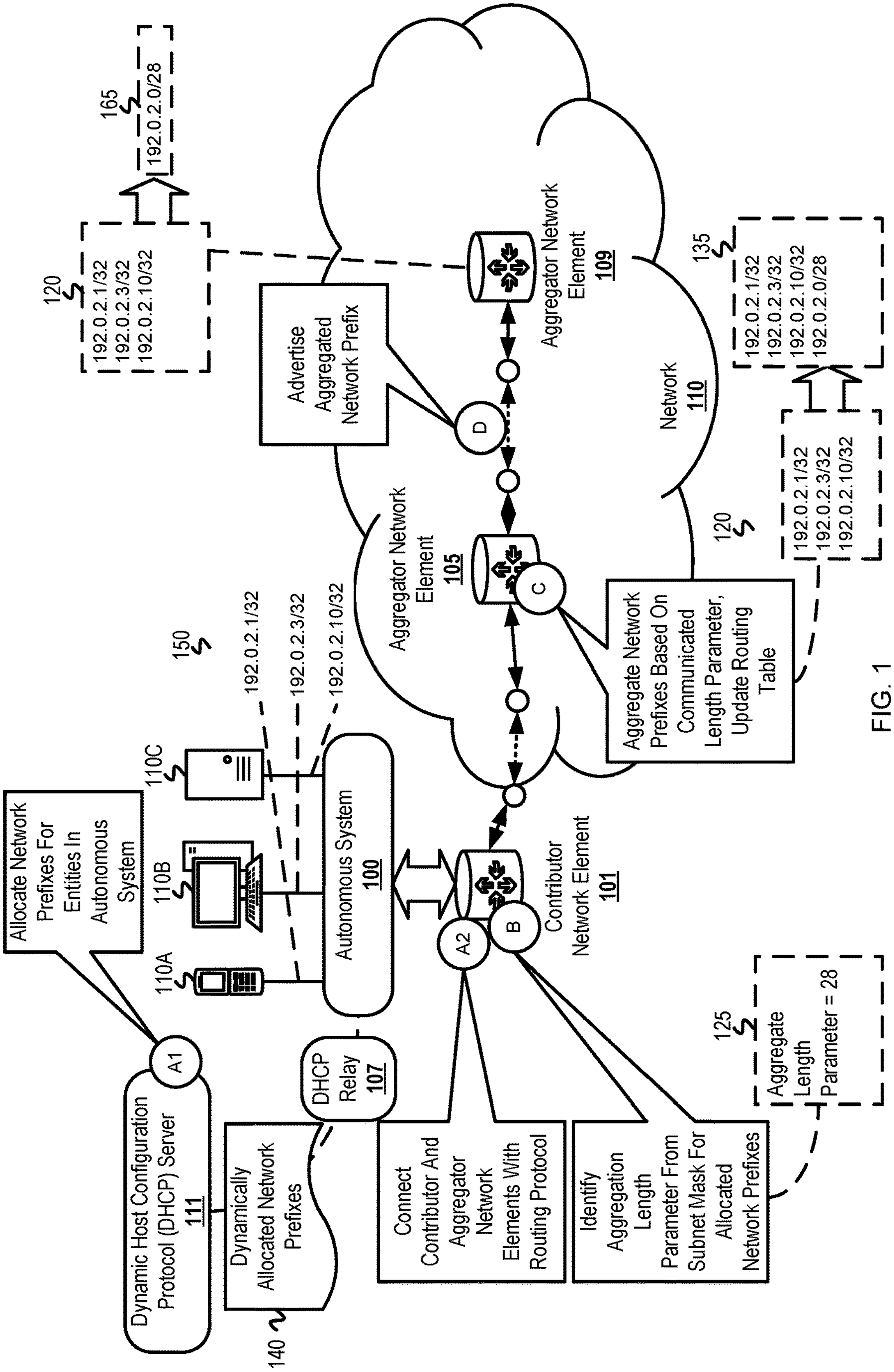
FIG. 1 is a schematic diagram of an example system for aggregating dynamically allocated network prefixes with a contributor-aggregator network configuration.

The description that follows includes example systems, methods, techniques, and program flows to aid in understanding the disclosure and not to limit claim scope. Well-known instruction instances, protocols, structures, and techniques have not been shown in detail for conciseness.

Terminology

A “prefix” or “network prefix” as used herein refers to a range of Internet Protocol (IP) addresses defined by an IP address and corresponding subnet mask. For instance, 192.0.2.0/24 in Classless Inter-Domain Routing (CIDR) notation comprises a network prefix of all IP addresses for the IP address 192.0.2.0 with subnet mask 255.255.255.0 in dot-decimal notation. The phrase “encompassed by” in reference to network prefixes refers to a first network prefix whose range of IP addresses are included in the range of IP addresses of a second network prefix. To exemplify, if network prefix A is encompassed by network prefix B, then each IP address in the range of IP addresses for network prefix A is included in the range of IP addresses for network prefix B.

Use of the phrase “at least one of” preceding a list with the conjunction “and” should not be treated as an exclusive list and should not be construed as a list of categories with one item from each category, unless specifically stated otherwise. A clause that recites “at least one of A, B, and C” can be infringed with only one of the listed items, multiple of the listed items, and one or more of the items in the list and another item not listed.

Overview

Current implementations of network prefix aggregation typically involve manually configuring aggregation parameters by a network administrator at the routers that aggregate network prefixes. This presents a logistical challenge when a large volume of network prefixes is dynamically allocated by an Internet Protocol (IP) address management service, for instance by the Dynamic Host Configuration Protocol (DHCP). Moreover, in some deployments the network administrators may not have prior knowledge of dynamically allocated network prefixes such as those allocated by the IP address management service. The present disclosure introduces a logical subdivision of “contributor” and “aggregator” network elements for dynamic aggregation of network prefixes that circumvents manual configuration of network prefix aggregation by network administrators. A contributor network element (“contributor”) acts as a DHCP client or a DHCP relay connected to a DHCP server that dynamically allocates IP addresses to entities in an autonomous system. The contributor acts as a border network element for its respective autonomous system. The contributor advertises network prefixes for the dynamically allocated IP addresses to an aggregator network element (“aggregator”).

The contributor receives dynamically allocated IP addresses and an associated subnet mask from the IP address management service and identifies an aggregation length parameter from the subnet mask. The contributor communicates the aggregation length parameter in a packet of a routing protocol to the aggregator, and the aggregator determines an aggregate network prefix according to at least one of the set of network prefixes and the aggregation length parameter. Subsequently, the aggregator advertises the aggregate prefix instead of the set of network prefixes to the network, which reduces net storage of network prefixes in routing tables at the network. The aggregator retains each of the set of network prefixes such that when a peer in the network communicates network traffic with a destination IP address within the range of IP addresses that is specified by the aggregated network prefix but not by any of the set of network prefixes, the aggregator drops the network traffic before it reaches the contributor. Because the contributor is configured to operate on the aggregation length parameter in association with one or more of the set of network prefixes and communicate the aggregation length parameter to the aggregator, a network administrator does not need to manually identify and aggregate network prefixes at the aggregator, which reduces labor costs and storage at network elements in the network and other network elements where the aggregated network prefixes are advertised.

Example Illustrations

FIG. 1 is a schematic diagram of an example system for aggregating dynamically allocated network prefixes with a contributor-aggregator network configuration. The example system in FIG. 1 comprises a contributor network element ("contributor") 101 and an aggregator network element ("aggregator") 105. The contributor 101 acts as a border network element that identifies sets of network prefixes and aggregation length parameters to generate aggregated network prefixes, and the aggregator 105 aggregates the network prefixes based on aggregation length parameters communicated from the contributor 101. The aggregator 105 advertises aggregated network prefixes instead of the set of network prefixes that they encompass. Each BGP peer or network element with a connection according to other routing protocols can be designated a contributor or an aggregator according to this network configuration.

The terms "contributor" and "aggregator" refer to network elements with assigned roles for the purpose of network prefix aggregation in a network configuration throughout the present disclosure. The roles at the contributor and aggregator are orchestrated by respective contributor and aggregator software components/services using built in functionality of network elements including advertisement and communication according to routing protocols as well as additional functionality that enables additional operations within communications and operations based on receiving communications for various protocols. For instance, communication of aggregation length parameters from a contributor to an aggregator uses built in functionality for a corresponding routing protocol, while aggregating network prefixes at the aggregator is an additional functionality built on top of the routing protocol. The contributor and aggregator software components/services oversee both operations.

The contributor 101, serving as a border network element to an autonomous system 100, interacts with a DHCP server 111 to lease dynamically allocated network prefixes 140 for an autonomous system 100. The contributor 101 receives the dynamically allocated network prefixes 140 and corresponding subnet masks and determines aggregation length parameters based on the subnet masks. The aggregator 105 identifies an aggregate network prefix according to the indications of the set of network prefixes and the aggregation length parameter and advertises the aggregate network prefixes over the set of network prefixes to a network 110.

FIG. 1 is annotated with a series of letters A1, A2, B, C, and D. Each stage represents one or more operations. Although these stages are ordered for this example, the stages illustrate one example to aid in understanding this disclosure and should not be used to limit the claims. Subject matter falling within the scope of the claims can vary from what is illustrated. Stages A1 and A2 in FIG. 1 comprise operations performed prior to aggregating network prefixes and can occur simultaneously or asynchronously as network prefixes are dynamically allocated and network elements connect with other network elements.

At stage A1, the DHCP server 111 (or other IP address management service) allocates dynamically allocated network prefixes 140 for network entities of the autonomous system 100, which include a cell phone 110A, computer 110B, and server 110C in this example. As the contributor 101 (the DHCP client in this example) detects additional entities corresponding to network prefixes of the autonomous system 100, the contributor 101 communicates a DHCP request to the DHCP server 111 that can be relayed by a DHCP relay 107 (e.g., when the contributor 101 and the DHCP server 111 are on different networks). For instance, the contributor 101 can detect new device identifiers connected to a private or public network of the autonomous system 100 (e.g., when the contributor is a wide area network router for the autonomous system 100) and, based on detecting the new device identifiers, can communicate DHCP requests to the DHCP server 111. The DHCP server 111 then leases network prefixes from pre-allocated blocks of IP addresses and communicates the leased network prefixes to the contributor 101 as well as additional parameters, such as a time period for the lease and subnet masks for the allocated network prefixes, depicted as the dynamically allocated network prefixes 140. The contributor 101 can subsequently request renewal of leases for devices/entities still connected to the autonomous system 100 as their lease periods timeout. Example dynamically allocated IP addresses 150 comprise 192.0.2.1/32, 192.0.2.3/32, and 192.0.2.10/32 for network entities 110A, 110B, and 110C, respectively. The IP addresses 150 can be aggregated under various network prefixes such as 192.2.0.0/28, 192.2.0.0/24, etc. The IP addresses dynamically allocated by the DHCP server 111 can comprise public or private IP addresses based on the configuration of the DHCP server 111 and the autonomous system 100. In some instances, when the IP addresses are private, the contributor 101 maintains a network address translation (NAT) table that maps private IP addresses to public IP addresses for the purposes of advertisement to the aggregator 105 and the network 110 and processing of ingress/egress network traffic at the contributor 101.

At stage A2, the contributor 101 and the aggregator 105 connect according to a routing protocol. For instance, for the BGP, the contributor 101 and the aggregator 105 can enter an "Established" state as peers. Once the contributor 101 and the aggregator 105 connect, the contributor 101 advertises network prefixes dynamically allocated by the DHCP server 111. For instance, for BGP, the contributor 101 advertises network layer reachability information (NLRI) for the autonomous system 100. As devices disconnect from the autonomous system 100 and their dynamically allocated network prefixes timeout, the contributor 101 can suppress advertisement of these network prefixes to the aggregator 105 and other peers.

Although depicted as connected to a single aggregator for simplicity, the contributor 101 can be connected to multiple aggregators and/or contributors. States corresponding to connectivity between the contributor 101 and the aggregator 105 can vary by routing protocol.

At stage B, the contributor 101 determines an aggregation length parameter from allocated network prefixes. For instance, the contributor 101 can identify an aggregated network prefix as a number of 1 bits in a subnet mask for network prefixes in the dynamically allocated network prefixes 140. As depicted in FIG. 1, an example aggregation length parameter 125 with value 28 is provided as the number of 1 bits in a subnet mask 11111111.11111111.11111111.1111000 for the example IP addresses 150 by the DHCP server 111.

Once the contributor 101 identifies the aggregation length parameter (e.g., the example aggregation length parameter 125), the contributor 101 communicates the aggregation length parameter to the aggregator 105 as a value in a field of a packet for a routing protocol associated with a network prefix in the network prefixes to be aggregated. For instance, the contributor 101 can encode the aggregation length parameter as a value in a field for a packet indicating any of the network prefixes in the table 120 for the depicted example. When the routing protocol is BGP, the contributor 101 can encode the aggregation length parameter as a value in a community attribute, extended community attribute, or path attribute. The extended community attribute allows the contributor 101 to carry the aggregation length parameters and an AS number of a network (e.g., the network 110) where the aggregator 105 creates and advertises the aggregated network prefix. These attributes can be encoded in UPDATE messages of BGP. As an example implementation when the aggregation length parameter is encoded as an extended community attribute, the first byte indicates that the extended community attribute is an autonomous system specific extended community and the second byte (the Sub-Type) is a custom byte that indicates that the extended community attribute has an aggregation length parameter encoded therein. The subsequent bytes comprise a number of an AS for the network 110 and the aggregation length parameter. The codepoint for the Sub-Type (i.e., an octet allocated to the custom byte) is to be assigned by the Internet Assigned Numbers Authority (IANA) according to standards laid out by Request for Comments (RFC) 4360 and 7153. Example Sub-Types comprise a Transitive Two-Octet AS-specific Extended Community Sub-Type and/or a Transitive Four-Octet AS-Specific Extended Community Sub-Type.

When the aggregator 105 receives the autonomous system number in an extended community attribute, the aggregator determines whether the autonomous system number matches an autonomous system number hard coded at the aggregator 105 for network prefix aggregation (e.g., as configured by an administrator managing the aggregator-contributor network architecture depicted in FIG. 1). If the autonomous system number matches, then the remaining operations at stages C and D occur. Otherwise, the aggregator forwards a packet corresponding to the extended community attribute to its next hop and does not perform any aggregation operations.

At stage C, the aggregator 105 aggregates network prefixes based on the communicated aggregation length parameter and updates its routing table. The aggregator 105 generates an aggregated network prefix that comprises the network prefix indicated in the packet with the aggregation length parameter encoded as a value (e.g., any of the example IP addresses 150) with a subnet mask applied with subnet mask length (i.e., number of 1 bits) according to the aggregation length parameter. For the depicted example, the subnet mask comprises 28 1 bits which yields the example aggregated network prefix 165 of 192.0.2.0/28 in Classless Inter-Domain Routing (CIDR) notation. The aggregator 105 then updates its routing table to comprise both previously advertised network prefixes by the contributor 101 as well as the aggregated network prefixes. Applied to an example table 120

192.0.2.1/32
192.0.2.3/32
192.0.2.10/32 this yields the following example updated routing table 135:

192.0.2.1/32
192.0.2.3/32
192.0.2.10/32
192.0.2.0/28

The aggregated network prefixes can inherit attributes of any constituent network prefixes that they encompass. The aggregator 105 can inspect attributes of the constituent network prefixes to determine preferred attributes to include in the aggregated network prefixes. For instance, each aggregated network prefix can inherit a highest weight attribute, a highest local preference attribute, and a lowest Multi-Exit Discriminator (MED) attribute among its constituent network prefixes. Other attributes, such as autonomous system path length attributes, eBGP path vs iBGP path attributes, oldest path attributes, router identifier attributes, etc. can additionally be inherited.

At stage D, the aggregator 105 advertises the aggregated network prefix to an aggregator network element 109 in the network 110 and, optionally, further advertises removing previously advertised network prefixes encompassed by the aggregated network prefix. For the example table 120, the aggregator network element 109 removes the network prefixes in the example table 120 and replaces them with example aggregated network prefix 165 of 192.0.2.0/28.

Each of the network elements 101, 105, and 109 are depicted with multiple intermediary hops in FIG. 1. Each intermediary hop can maintain a routing table with routing information for preferred paths between pairs of network elements. Intermediary network elements can comprise other BGP peers or other wide area network routers.

Figure 2:
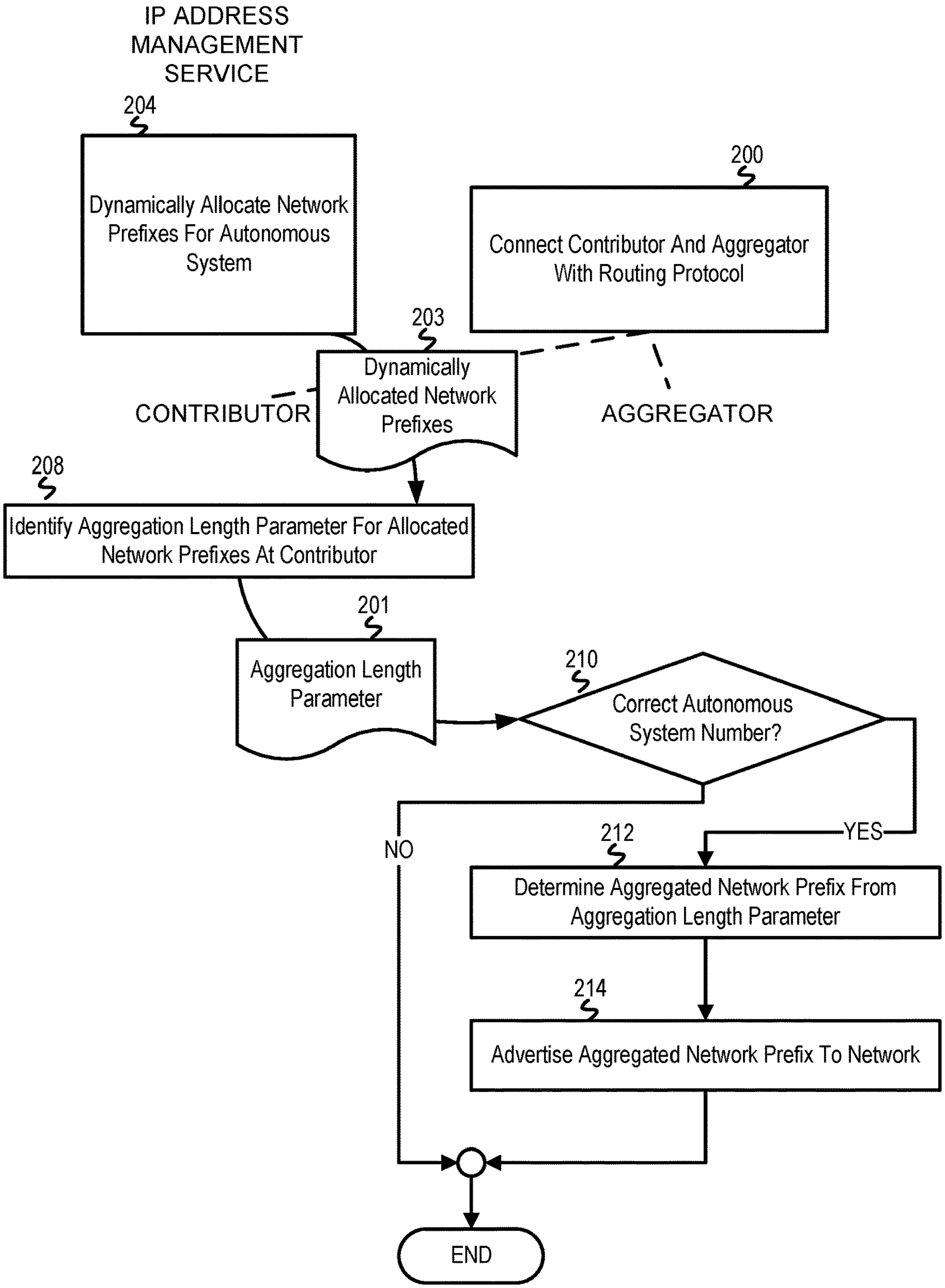
FIG. 2 is a flowchart of example operations for aggregating network prefixes with a contributor-aggregator network configuration.
Figure 3:
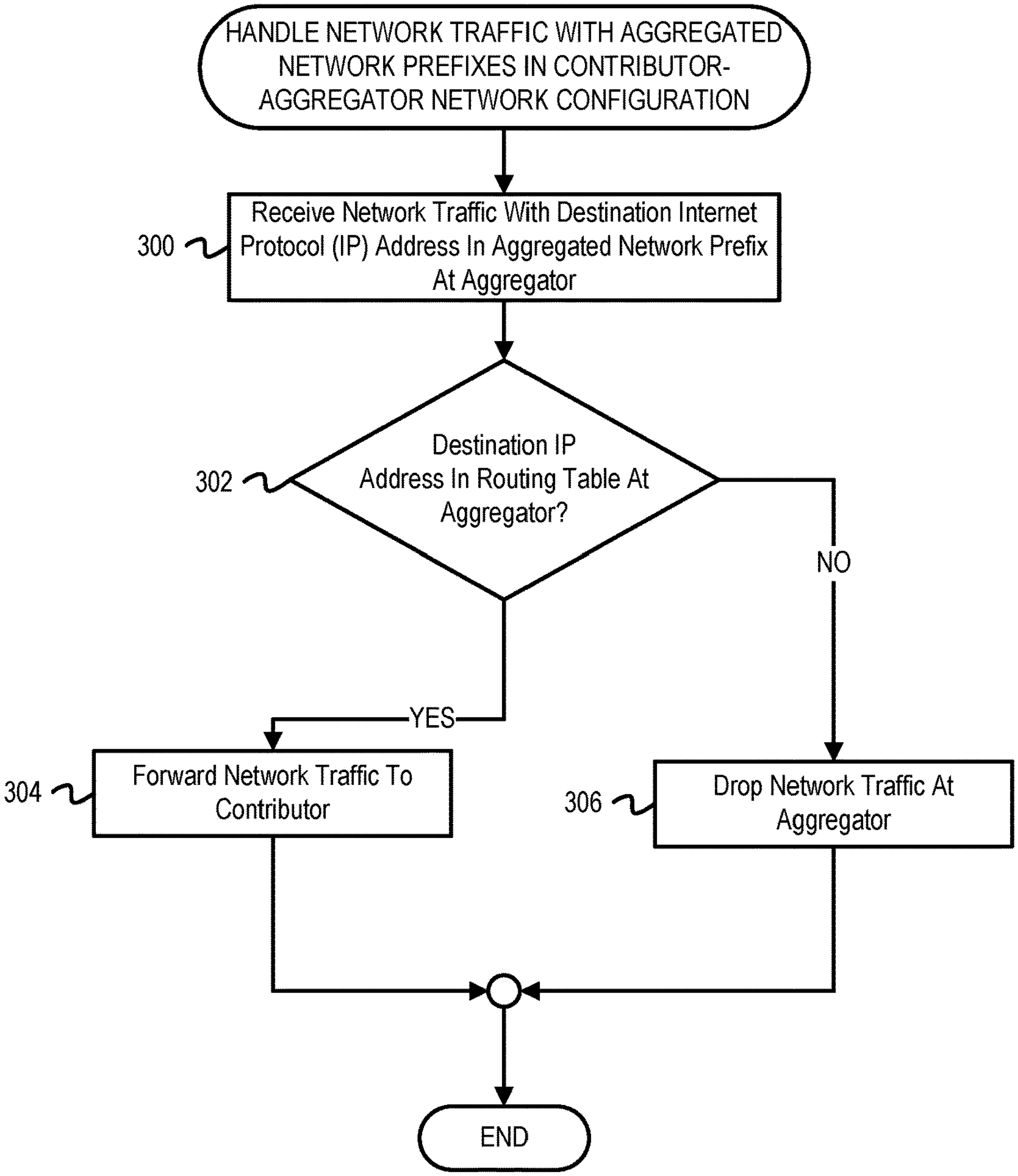
FIG. 3 is a flowchart of example operations for handling network traffic with aggregated network prefixes in a contributor-aggregator network configuration.

FIGS. 2-3 are flowcharts of example operations for various embodiments of aggregating network prefixes, and handling network traffic in a contributor-aggregator network configuration. The example operations are described with reference to a contributor network element ("contributor") and an aggregator network element ("aggregator") for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of example operations for aggregating network prefixes with a contributor-aggregator network configuration. FIG. 2 depicts blocks with various operations occurring at an IP address management service (e.g., a DHCP server), a contributor network element ("contributor") and an aggregator network element ("aggregator"). The IP address management service dynamically allocates network prefixes asynchronously to the remaining operations for network prefix aggregation. The contributor and aggregator are assumed to have a connection for a routing protocol (block 200) prior to the remaining operations for network prefix aggregation.

At block 200, at least one of the contributor at the border of the autonomous system and the aggregator connect according to a routing protocol. For instance, for BGP, each of the contributor and the aggregator can transition from an Idle state, to a Connect state, to an Active state, to an OpenSent state, to an OpenConfirm state, and to an Established state where a connection has been established. Any combination of state transitions that navigates to the Established state in the BGP finite state machine can occur. The contributor and the aggregator can connect with additional network elements such as other aggregator network elements, other border network elements for other autonomous systems, etc.

At block 204, an IP address management service allocates IP addresses for the autonomous system bordered by the contributor. For instance, a DHCP client at the contributor or other network component communicates a DHCPDISCOVER message, one or more DHCP severs respond (e.g., via a DHCP relay) with a DHCPOFFER message, the DHCP client communicates a DHCPREQUEST to a selected one of the DHCP servers, and the DHCP server responds with a DHCPACK message. The DHCPACK message at least comprises an IP address and a subnet mask that specify a range of leased IP addresses to the DHCP client. The DHCP client can store the IP address and subnet mask in a database for future determination of aggregated network prefixes and to track existing IP addresses at the autonomous system. The contributor can periodically request renewal of IP address leases when corresponding devices are still connected to the autonomous system as the leases offered by the DHCP server expire. The IP address management service communicates dynamically allocated network prefixes 203 to the contributor. The dynamically allocated network prefixes 203 comprise subnet masks and leasing data.

At block 208, the contributor identifies an aggregation length parameter 201 for one or more of the dynamically allocated network prefixes 203 allocated by the IP address management service. For instance, the contributor can identify the aggregation length parameter as the number of 1 bits in a subnet mask indicated in the dynamically allocated network prefixes 203. The contributor communicates the aggregation length parameter 201 to the aggregator encoded in a field of a packet for one of the dynamically allocated network prefixes 203 according to the routing protocol. For instance, when the contributor and the aggregator have an established connection for BGP, the contributor can communicate an UPDATE message comprising an allocated network prefix with the aggregation length parameter encoded in an extended community attribute, a community attribute, and/or a path attribute. The aggregator is configured to inspect the fields where the aggregation length parameter may be encoded.

At block 210, the aggregator determines whether an extended community attribute where the aggregation length parameter 201 is indicated comprises a correct autonomous system number. The example operations at block 210 are specific to BGP and encoding aggregation length parameters in extended community attributes, and operations for determining whether to aggregate network prefixes at the aggregator can vary with respect to routing protocol and methods of encoding. For the provided example, the extended community attribute comprises a first byte that indicates the extended community attribute is autonomous system specific, a second byte that indicates the extended community attribute has one or more Sub-Types customized for aggregation of network prefixes, an autonomous system number, and the aggregation length parameter 201. The one or more Sub-Types comprise Sub-Types with a codepoint to be assigned by the IANA and can comprise a Transitive Two-Octet AS-specific Extended Community Sub-Type and/or a Transitive Four-Octet AS-Specific Extended Community Sub-Type. In the case of extended community attributes for BGP, the extended community attributes can be generated according to standards codified in RFC 4360 and RFC 7153.

The aggregator inspects the autonomous system number and determines whether it matches a hard coded autonomous system number (the "correct" autonomous system number), e.g., as configured by a network administrator of the contributor and the aggregator. If the autonomous system number is correct, operational flow proceeds to block 212. Otherwise, the aggregator forwards any network traffic associated with the aggregation length parameter 201 to its next hop and operational flow in FIG. 2 terminates.

At block 212, the aggregator determines an aggregated network prefix from the aggregation length parameter and an allocated network prefix. To exemplify, for an allocated network prefix of 198.0.2.123/25 and an aggregation length parameter of 256, then the aggregated network prefix is 198.0.2.0/24. Alternatively, the aggregation length parameter can comprise a number of bits, in this instance 8 bits. The aggregator adds the aggregated network prefix to its routing table and retains previous network prefixes encompassed by the aggregated network prefix to track which network prefixes are available to the autonomous system.

At block 214, the aggregator advertises the aggregated network prefix to peers in a network. The aggregator additionally advertises to remove network prefixes that are encompassed by the aggregated network prefix. The aggregated network prefix is then propagated to reduce overall load on the network.

FIG. 3 is a flowchart of example operations for handling network traffic with aggregated network prefixes in a contributor-aggregator network configuration. At block 300, the aggregator receives network traffic with a destination IP addresses in an aggregated network prefix. The aggregated network prefix comprises network prefixes encompassed by the aggregated network prefix that are allocated to an autonomous system managed by the contributor (e.g., allocated by a DHCP server) and advertised from the contributor to the aggregator. The aggregated network prefix can comprise sub-blocks of network prefixes not presently allocated to the autonomous server.

At block 302, the aggregator determines whether the destination IP address is in a network prefix besides the aggregated network prefix from its routing. The routing table at the aggregator at least comprises network prefixes allocated to the autonomous system and the aggregated network prefix. If the destination IP address is in a network prefix of the routing table not including the aggregated network prefix, operational flow proceeds to block 304. Otherwise, operational flow proceeds to block 306.

At block 304, the aggregator forwards the network traffic to the contributor and the contributor communicates the network traffic to corresponding entities for its autonomous system, possibly after network address translation and/or tunneling. The operational flow in FIG. 3 is complete.

At block 306, the aggregator drops the network traffic. The aggregator can, depending on corresponding protocols of the network traffic, communicate a return to sender message indicating the dropped communication. The operational flow in FIG. 3 is complete.

Variations

The present disclosure refers to packets communicated between contributor and aggregator network elements for routing protocols and encoding values such as aggregation length parameters in packet fields. Alternatively, any protocol data unit for any protocol and/or Open Systems Interconnection layer can be implemented in the contributor/aggregator network configuration.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 4:
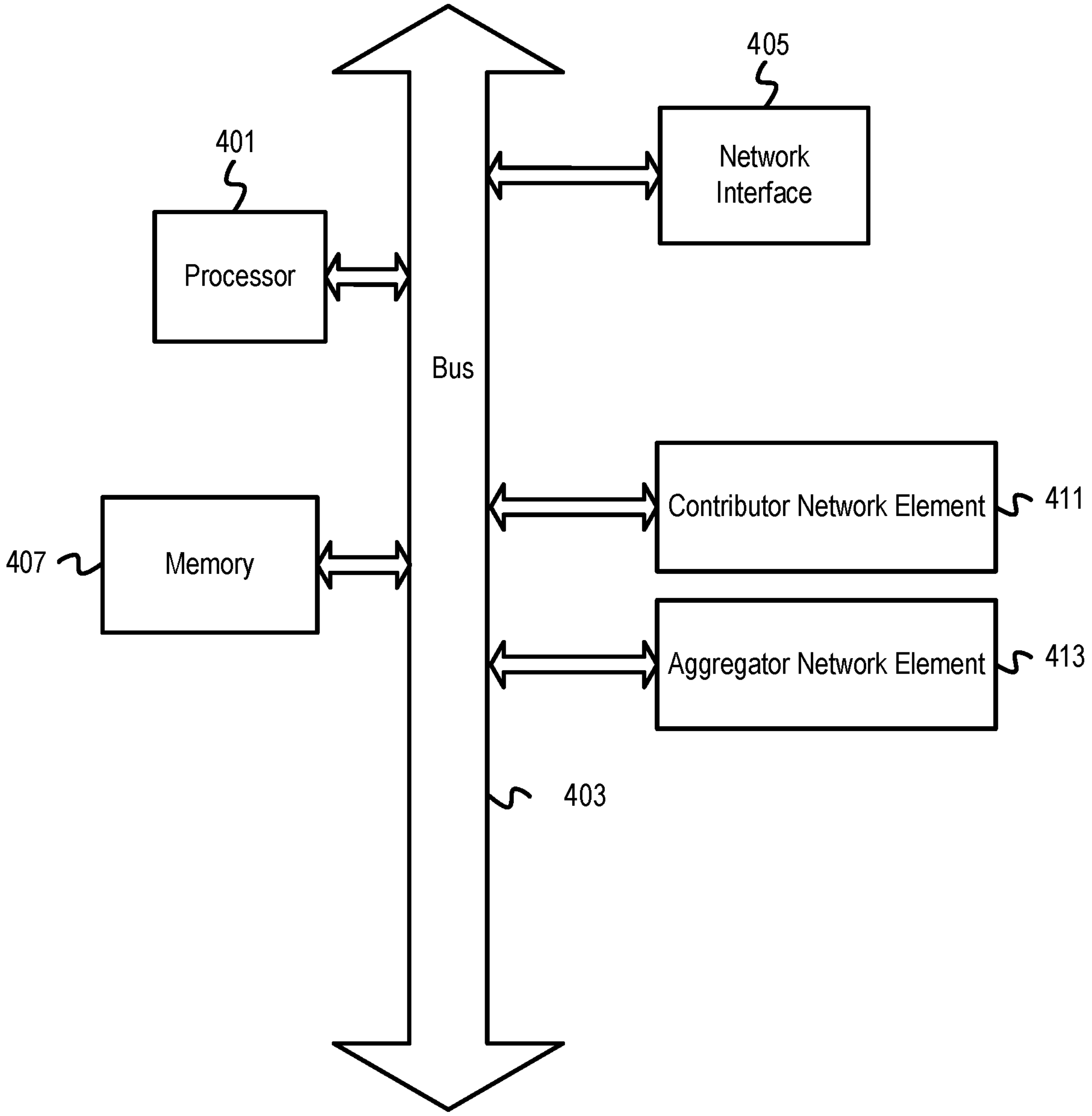
FIG. 4 depicts an example computer system with a contributor network element and an aggregator network element.

FIG. 4 depicts an example computer system with a contributor network element and an aggregator network element. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes a contributor network element ("contributor") 411 and an aggregator network element ("aggregator") 413. The contributor 411 identifies aggregation length parameters indicating sizes of aggregated network prefixes for network prefixes allocated to an autonomous system managed by the contributor 411. The contributor 411 communicates the aggregation length parameters to the aggregator 413 according to a routing protocol and the aggregator 413 determines aggregated network prefixes from the aggregation length parameters. The aggregator 413 advertises the aggregated network prefixes over network prefixes allocated to the autonomous system to its peers. The aggregator 413 is configured to handle network traffic directed to network prefixes in the aggregated network prefixes that may or may not be directed at a network prefix allocated to the autonomous system. Although the contributor 411 and the aggregator 413 are depicted as components of a same computer system to aid in illustration, these components can be deployed and executed across multiple computer systems/devices in a network. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

The invention claimed is:

1. A method comprising:

advertising one or more first prefixes from a first network element to a second network element, wherein the first network element and the second network element are peer network elements in the Border Gateway Protocol (BGP);

identifying, at the first network element, a parameter that represents an aggregation length for the one or more first prefixes;

communicating, from the first network element to the second network element, the parameter encoded in a field of one or more protocol data units corresponding to the BGP, wherein the parameter is encoded in at least one of an extended community attribute, a community attribute, and a path attribute in the one or more protocol data units;

generating, at the second network element, a second prefix comprising the one or more first prefixes based, at least in part, on the parameter; and inserting the second prefix into a routing table at the second network element.

2. The method of claim 1, further comprising advertising the second prefix from the second network element to a third network element.

3. The method of claim 1, wherein the first network element is a border network element for an autonomous system comprising prefixes for at least the one or more first prefixes.

4. The method of claim 1, wherein the one or more first prefixes comprise Internet Protocol (IP) addresses allocated from a pool of IP addresses according to the Dynamic Host Configuration Protocol (DHCP), further wherein identifying the parameter comprises identifying the parameter from a subnet mask of the pool of IP addresses.

5. The method of claim 1, wherein the second prefix inherits one or more attributes of the one or more first prefixes, further wherein the one or more attributes comprise at least one of a weight attribute, a local-preference attribute, and a Multi-Exit Discriminator attribute, further wherein the second prefix inherits most preferred ones of the weight attributes, local preference attributes, and Multi-Exit Discriminator attributes when multiple of each attribute type are present for the one or more first prefixes.

6. The method of claim 1, further comprising:

receiving, at the second network element, a first protocol data unit with a destination Internet Protocol (IP) address in the second prefix; and at least one of, based on determining that the one or more first prefixes comprise the destination IP address, forwarding the first protocol data unit to the first network element; and based on determining that the one or more first prefixes do not comprise the destination IP address, dropping the first protocol data unit.

7. One or more non-transitory, machine-readable media having program code stored thereon, the program code comprising instructions to:

advertise one or more first prefixes from a first network element to a second network element, wherein the first network element and the second network element are peer network elements in the Border Gateway Protocol (BGP);

communicate, from the first network element to the second network element, a parameter indicating an aggregation length for the one or more first prefixes encoded in a field of one or more protocol data units corresponding to the BGP, wherein the parameter is encoded in at least one of an extended community attribute, a community attribute, and a path attribute in the one or more protocol data units;

generate, at the second network element, a second prefix comprising the one or more first prefixes based, at least in part, on the parameter; and insert the second prefix into a routing table of the second network element.

8. The one or more non-transitory, machine-readable media of claim 7, wherein the program code further comprises instructions to:

receive, at the second network element, a first protocol data unit with a destination Internet Protocol (IP) address in the second prefix;

based on determining that the one or more first prefixes comprise the destination IP address, forward the first protocol data unit to the first network element; and based on determining that the one or more first prefixes do not comprise the destination IP address, drop the first protocol data unit.

9. The one or more non-transitory, machine-readable media of claim 7, wherein the first network element is a border network element for an autonomous system comprising at least the one or more first prefixes.

10. The one or more non-transitory, machine-readable media of claim 7, wherein the one or more first prefixes comprise Internet Protocol (IP) addresses allocated from a pool of IP addresses according to the Dynamic Host Configuration Protocol (DHCP) wherein the program code further comprises instructions to identify the parameter from a subnet mask of the pool of IP addresses.

11. The one or more non-transitory, machine-readable media of claim 7, wherein the second prefix inherits one or more attributes of the one or more first prefixes, further wherein the one or more attributes comprise at least one of a weight attribute, a local-preference attribute, and a Multi-Exit Discriminator attribute, further wherein the second prefix inherits most preferred ones of the weight attributes, local preference attributes, and Multi-Exit Discriminator attributes when multiple of each attribute type are present for the one or more first prefixes.

12. The one or more non-transitory, machine-readable media of claim 7, wherein the second prefix comprises the one or more first prefixes aggregated according to the aggregation length indicated by the parameter.

13. The one or more non-transitory, machine-readable media of claim 7, wherein the program code further comprises instructions to advertise the second prefix from the second network element to a third network element, wherein the second network element and the third network element are peer network elements in the BGP.

14. A system comprising:

one or more processors;

a first network element;

a second network element, wherein the second network element is a peer of the first network element in the Border Gateway Protocol (BGP); and one or more machine-readable media having instructions stored thereon that are executable by the one or more processors to cause the system to, advertise one or more first prefixes from the first network element to the second network element, wherein the first network element is a border network element for an autonomous system comprising at least the one or more first prefixes;

identify, at the first network element, a parameter indicating an aggregation length for the one or more first prefixes;

communicate the parameter from the first network element to the second network element encoded in at least one of an extended community attribute, a community attribute, and a path attribute in one or more protocol data units of the BGP; and insert a second prefix into a routing table at the second network element, wherein the second prefix comprises the one or more first prefixes aggregated according to the aggregation length indicated by the parameter.

15. The system of claim 14, wherein the one or more machine-readable media further have stored thereon instructions executable by the one or more processors to cause the system to advertise the second prefix from the second network element to a third network element, wherein the third network element is a peer of the second network element in the routing protocol.

16. The system of claim 14, wherein the first network element is a border network element for an autonomous system comprising at least the one or more first prefixes.

17. The system of claim 14, wherein the one or more first prefixes comprise Internet Protocol (IP) addresses allocated from a pool of IP addresses according to the Dynamic Host Configuration Protocol (DHCP).

18. The system of claim 17, wherein the instructions to identify the parameter indicating the aggregation length further comprise the instructions executable by the one or more processors to cause the system to identify the parameter in a subnet mask of the pool of IP addresses.

19. The system of claim 14, wherein the one or more machine-readable media further have stored thereon the instructions executable by the one or more processors to cause the system to:

receive, at the second network element, a first protocol data unit with a destination Internet Protocol (IP) address in the second prefix; and at least one of, based on determining that the one or more first prefixes comprise the destination IP address, forward the first protocol data unit to the first network element; and based on determining that the one or more first prefixes do not comprise the destination IP address, drop the first protocol data unit.

20. The system of claim 14, wherein the second prefix inherits one or more attributes of the one or more first prefixes, further wherein the one or more attributes comprise at least one of a weight attribute, a local-preference attribute, and a Multi-Exit Discriminator attribute, further wherein the second prefix inherits most preferred ones of the weight attributes, local preference attributes, and Multi-Exit Discriminator attributes when multiple of each attribute type are present for the one or more first prefixes.

* * * * *